Jan. 17, 1956   D. F. WILCOCK   2,731,308
SELF-ALIGNING THRUST BEARING STRUCTURE
Filed Aug. 30, 1952   2 Sheets-Sheet 2

Inventor:
Donald F. Wilcock,
by Richard E. Hosley,
His Attorney.

United States Patent Office 2,731,308
Patented Jan. 17, 1956

2,731,308

SELF-ALIGNING THRUST BEARING STRUCTURE

Donald F. Wilcock, Marblehead, Mass., assignor to General Electric Company, a corporation of New York Application August 30, 1952, Serial No. 307,351

10 Claims. (Cl. 308—160)

This invention relates to bearing structures and specifically to thrust bearing structures combined with a self-aligning seat.

The present invention is related to that set forth in my concurrently filed and copending application Serial No. 308,969 filed September 11, 1952, with the same assignee as the present application.

Among the problems associated with the successful use of hydrodynamic thrust bearings is that of precise alignment. Not only is this necessary at initial assembly, but also, in many machines, deflections of the bearing support require adjustment of the thrust bearing position during operation, which often is accomplished by use of a self-aligning seat having mating portions with arcuate surfaces.

The friction inherent in a self-aligning seat structure under load can be materially reduced by pressure lubrication from an external source. Bearing structures having pockets supplied with lubricant from a high pressure pump operate with lower power losses, and possibly with lower lubricant flow, but must depend on the reliability of the pump for successful performance.

Accordingly, it is an object of my invention to provide a combined thrust bearing and self-aligning seat in which the friction inherent in the self-aligning seat under load is substantially eliminated.

Another object of my invention is to provide an improved self-aligning thrust bearing structure which operates at a low power loss without the use of a separate pumping means.

A further object of my invention is to provide a novel self-aligning thrust bearing structure wherein lubricant pressures are self-generated.

A still further object is to provide a combined self-aligning seat and thrust bearing where the load is carried and at the same time metallic contact of the mating seat surfaces is prevented or reduced by using pressurized oil in reservoirs on the arcuate surfaces of the self-aligning seat.

Another object of invention is to provide a self-aligning thrust bearing structure wherein the load is supported by lubricant under pressure contained in pockets, the lubricant pressure being generated within the bearing.

These and other objects of invention will become more apparent by reference to the following description taken in conjunction with the accompanying drawings, which illustrate preferred embodiments of my invention, but it will be understood that modifications of specific structural details may be made without exceeding the scope of the invention.

In the drawings,

Fig. 1a is a modification of the self-aligning seat structure disclosed in Fig. 1.

Fig. 3 is a section similar to Fig. 1 disclosing a modification of the self-aligning thrust bearing structure;

Fig. 3a is a modification of the self-aligning seat structure disclosed in Fig. 3.

Fig. 4 is an end elevation of the self-aligning member disclosed in Fig. 3; and

Figure 1:
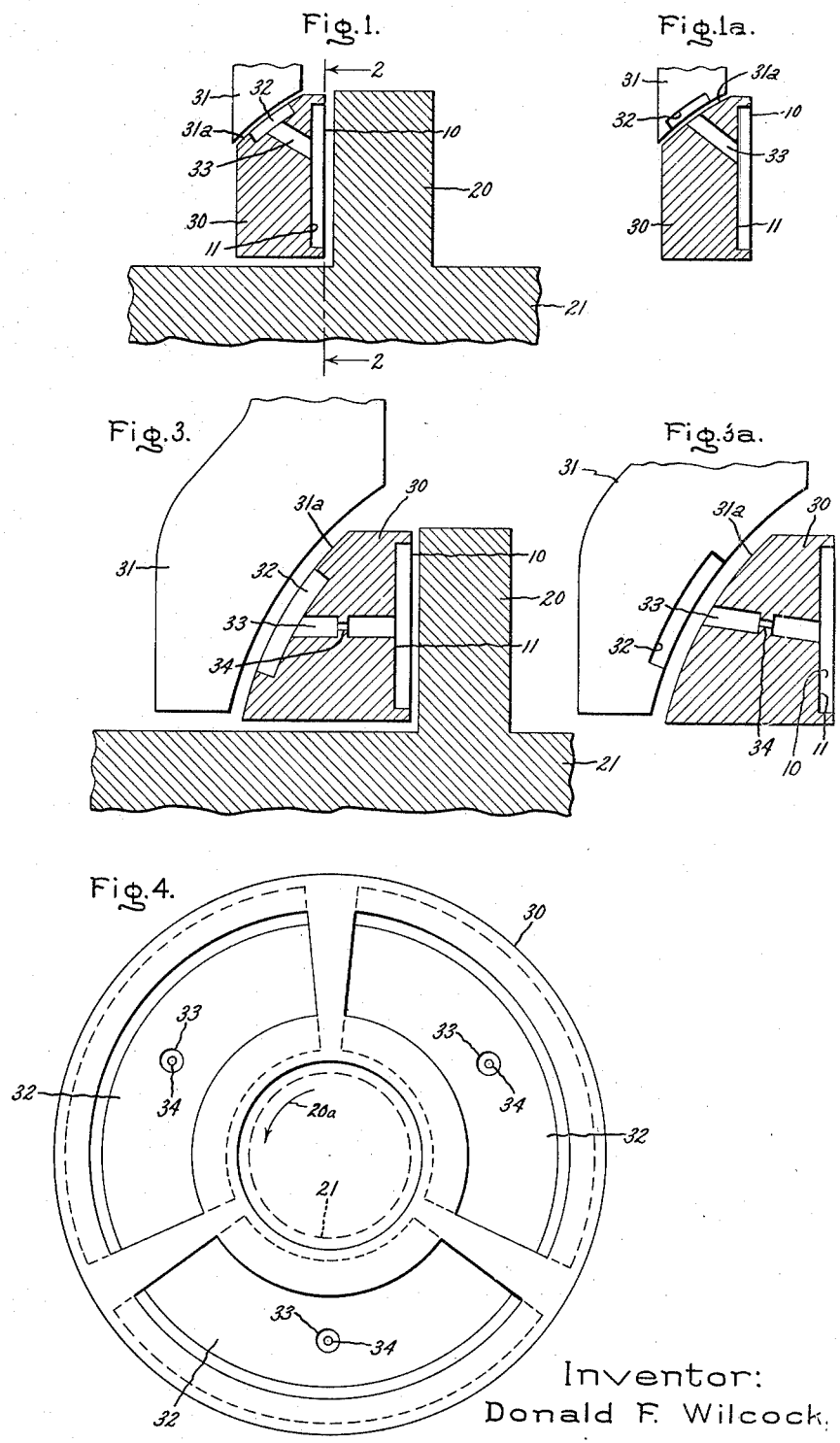
Fig. 1 is a partial longitudinal section of my novel self-aligning thrust bearing structure for use with a unidirectional rotating shaft.

In accordance with the illustrated embodiments of my invention, I employ a thrust bearing, having a series of lubricant pockets combined with pumping lands connected to sources of lubricant supply (not shown) and defining a self-pressurized bearing, with a pocketed self-aligning seat structure, corresponding pockets communicating with each other.

Referring to the figures in the drawings, wherein like numbers refer to like or similar members, a thrust collar 20 is shown extending radially from a unidirectional rotating shaft 21. A combined self-aligning thrust bearing member is indicated at 30, with the face of the thrust bearing at 10 and an arcuate self-aligning surface at 31a, the latter coacting with a complementary shaped self-aligning seat at 31. The thrust bearing face 10 has the structure disclosed in my cited, concurrently filed application and, with particular reference to Figs. 2 and 2c, includes a series of depressions on the contacting surface thereof, having pockets 11, of uniform depth, which are defined on three sides by lands of uniform height, these lands serving as the bearing surface for the journal. On the fourth side of the pocket, extending radially is a pumping land 12, which is below the bearing surface of the other lands and serves to lead a lubricant from groove 13, which is supplied by inlet channel 14 from an undisclosed source. The land may be located either at a constant level below the bearing surface or taper both in depth and width towards the lubricant pockets as in tapered land bearings.

Figure 2:
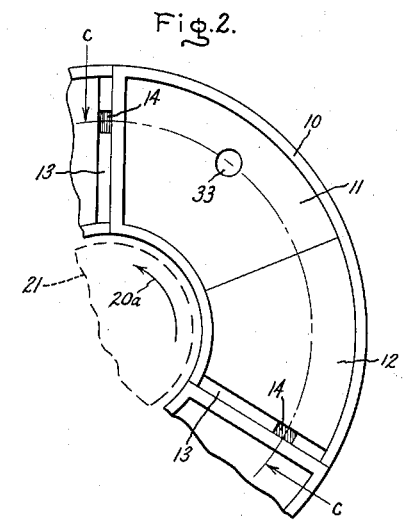
Fig. 2 is a fragmentary end elevation of the pocket structure in the thrust bearing of Fig. 1 looking in the direction 2—2.
Figure 2A:
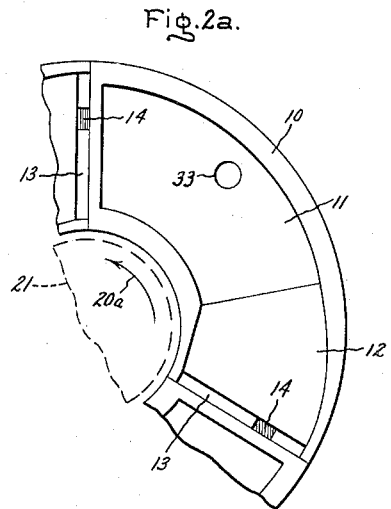
Fig. 2a is a view similar to Fig. 2 illustrating a modified pumping land structure.
Figure 2D:
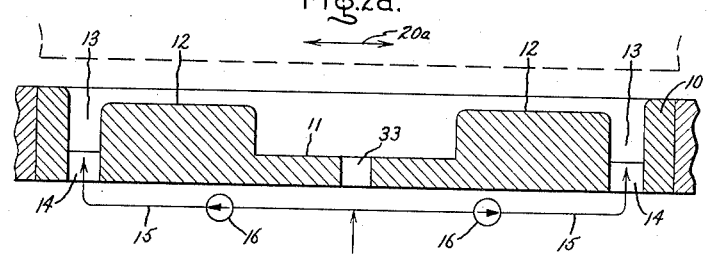
Fig. 2d is a fragmentary development of the section taken along line d—d of Fig. 2b.
Figure 2B:
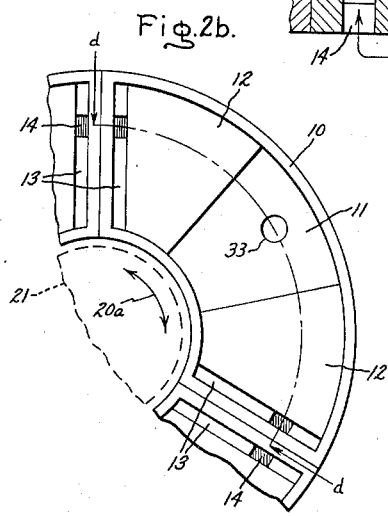
Fig. 2b is a fragmentary end elevation of pocket structure in a thrust bearing for use with a reversible rotating shaft.
Figure 2C:
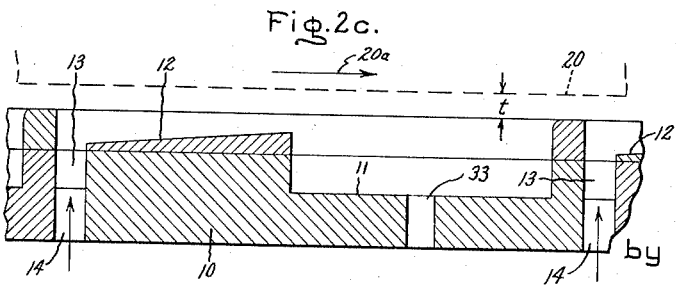
Fig. 2c is a fragmentary development of the section taken along line c—c of Fig. 2.

The principle of operation of my invention, as may be illustrated by reference to Figs. 2 and 2c, showing a single pocket with adjacent pumping land and lubricant grooves, is as follows: a lubricant, such as oil, is dragged from groove 13 over the pumping land 12 into the pocket 11 by the moving (or rotating) element 20, indicated by dotted lines, the direction of motion being shown by the arrow 20a.

The lubricant leaves the pocket by leakage over the bearing surface of the lands at either of the circumferential edges and at the ends of the pocket, by leakage back along the pumping land and by being carried over the land at the radial end of the pocket by shearing action of the moving element. These leakage flows are proportional to the lubricant pressure built up in the pocket and to the cube of the film thickness, while the shear flows caused by the moving element are independent of the pressure. This film thickness, $t$, will then adjust itself to equilibrium conditions such that the lubricant flows into and out of the pockets are equal and the pressure build up in the pockets is sufficient to carry the load imposed on the bearing. If desired, the effects of side leakage from the pumping land may be minimized by tapering the side walls in the direction of motion as disclosed in Fig. 2a. Likewise, small relief passages (not shown) may be made at the ends of the lubricant grooves to accommodate the leakage flow from adjacent high pressure pockets.

Figure 5:
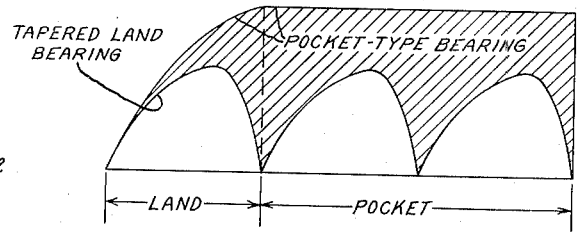
Fig. 5 is a generalized diagram of the pressure profiles built up in various types of thrust bearings.

The principle of my invention may be illustrated further by considering the pressure profile in the direction of motion along the pumping land, of either a fixed taper or variable taper type, in a thrust bearing. Solution of hydrodynamic equations will give a pressure profile for the land in the ordinary tapered land bearing as shown in Fig. 5, the pressure at the ends of the land being zero. By means of my invention, the pressure at the end of the land is maintained at a high value and the pressure profile becomes the upper curve of Fig. 5. By retaining this pressure generated by the pumping land in a pocket of large area, a tremendous advantage in load supporting capacity indicated by the cross-hatched area, is obtained, without the attendant power loss from shearing a thin lubricant film over the entire continuous area.

The pumping lands need not be adjacent the pockets to which they furnish the high pressure lubricant, and may be situated at other points of the bearing circumference if desirable, being connected to the pockets by suitable ducts. The width and depth of the lands may also be tapered or they may be constructed with no taper at all.

My invention may be adapted readily to give equal load carrying capacity for either direction of rotation by the design shown in Fig. 2b. In the case where reversible motion occurs, a pumping land is provided at either end of the lubricant pocket. Referring specifically to Figs. 2b and 2d, the bearing face 10 carries a number of pockets 11 outlined along the circumferential edges by bearing surfaces of uniform height. The radial ends of the pockets are defined by pumping lands 12 depressed below the bearing surfaces and leading from lubricant grooves 13 supplied by inlet channels 14, from conduit means 15 containing check valves 16, permitting lubricant to enter the grooves 13 but not to leave them through the conduit means.

The arcuately contoured surface or modified ball 31a has reservoirs 32 equal in number to the thrust bearing pockets 11 and respectively connected together by channels or ducts 33. The principle of operation remains the same whether the modified ball 31a carries the reservoirs 32 or the reservoirs be located on the self-aligning seat 31 as illustrated in Figs. 1a and 3a at 32.

In the self-aligning thrust bearing structure of Fig. 1, wherein ducts 33 contain no flow restrictions between corresponding pockets and reservoirs, it is necessary that the total of the reservoir area plus half the land area surrounding the reservoirs, projected in an axial direction, be less than the corresponding total area for the thrust bearing. If this is not the case, i. e., if the axially projected area is greater, all of the lubricant will flow from pockets 11 to the reservoirs 32 and the generated pressure in pockets 11 will be lower than that required to create a lubricant film at the thrust bearing. With the modified ball reservoir areas properly proportioned, lubricant pressure will carry a major portion of the thrust load at the self-aligning seat, and the portion carried by metallic contact between the mating faces of the self-aligning seat and modified ball will be reduced greatly. The frictional forces resisting alignment of the bearing will thereby be reduced very greatly, permitting more accurate positioning under load.

In the modification disclosed in Figs. 3 and 4, self-aligning seat friction is substantially completely eliminated; the reservoir area is larger than the thrust bearing pocket area, the flow to the reservoirs being limited by orifices 34 in the ducts 33. In this modification, it is desirable to machine the modified ball and self-aligning seat surfaces with radii differing by the calculated lubricant film thickness (normally 0.001" to 0.002") in order that the film thickness will be uniform at that separation. If this is not feasible, e. g., if the ball and seat surfaces are lapped together, it is desirable to use a large radius of curvature and to maintain the arcuate surfaces as nearly normal to the shaft axis as possible.

The restrictions in the channels or ducts between the thrust bearing pockets and the corresponding reservoirs may be either of the sharp-edged orifice type, in which case the flow is proportional to the square root of the pressure difference, or they may be of the capillary flow type, in which case the flow is proportional to the pressure difference and inversely proportional to the oil viscosity.

If a finite oil film is maintained between the ball and the self-aligning seat, as between the thrust bearing and thrust collar, the reservoir pressure will be dependent upon its relation to the area of the pocket, that is $$p_b = \frac{A}{A'} p_t \qquad (1)$$

where $p_b$ and $p_t$ are respectively the reservoir and pocket pressures in the self-aligning thrust bearing;

$A$ is the effective area of the thrust bearing (pocket area $+\frac{1}{2}$ land area).

$A'$ is the effective area of the modified ball, taken in an axial direction.

The flows are:

(a) Thrust bearing, $$Q_t = \frac{t^3 w}{12 \mu b} p_t \qquad (2)$$

(b) Modified ball, using sharp edge orifice, $$Q_b = j \sqrt{p_t \left(1 - \frac{A}{A'}\right)} \qquad (3)$$

and $$Q_b = \frac{s^3 w'}{12 \mu b'} \left(\frac{A}{A'}\right) p_t \qquad (4)$$

where, $Q$ is the oil flow
$t$ is the film thickness over the lands,
$w$ is the effective perimeter of the leakage land
$\mu$ is the oil viscosity
$b$ is width of the land surrounding pocket
$j$ is the overall orifice co-efficient
$s$ is the self-aligning seat film thickness
$w'$ is the effective perimeter of reservoir
$b'$ is the width of the reservoir land.

Equations (2), (3) and (4), together with the relations derived in the cited copending application for the pocket-type thrust bearing, are sufficient for the design of a self-aligning thrust bearing.

If small inter-connecting tubes are used in place of the sharp-edged orifice, equation (3) is replaced by $$Q_b = j' \left(1 - \frac{A}{A'}\right) \frac{p_t}{\mu} \qquad (5)$$

where, $j'$ is a function of the length and diameter of the connecting tubes.

In practice, if $Q_b = \frac{1}{3} Q_t$ and if $s = t$, both of which appear to be reasonable assumptions, it follows that the design requirements for the reservoirs may be summarized by $$\frac{b' A'}{w'} = 3 \frac{b A}{w} \qquad (6)$$

For reasons of stability it may be desirable to have at least three lubricant pockets, the principle of my invention having no relation to the number of pockets, but comprising the use of a pocket preceded by a pumping land. Neither is it my desire to restrict this invention to pumping lands of zero taper, although zero taper gives the optimum film thickness.

It is to be understood that certain structural details of my invention, such as the type of stop (not shown) to be used to prevent rotation of bearing element 30 or the method of supplying lubricant to the thrust bearing lubricant grooves, may be varied to suit the needs of a particular design, the disclosures herein being made for illustrative purposes only.

Although a preferred embodiment and modification of my invention have been shown and described, it will be readily understood by those skilled in the art that variations may be made in the disclosed structure without departing from the basic features of my invention. It is desired that my disclosure be considered illustrative and inclusive of all modifications and variations which may fall within the true scope of the appended claims and not limitative to the exact construction disclosed herein.

What I claim as new and desire to secure by Letters Patent of the United States is:

1. A self-aligning hydrodynamic thrust bearing comprising a stationary member having an arcuate bearing seat, a rotatable shaft member having a thrust collar, and a non-rotatable intermediate bearing member providing a first bearing surface for coacting with said thrust collar and a second bearing surface for coacting with said arcuate bearing seat; said first bearing surface comprising lands of uniform height surrounding a hydrodynamic pocket for containing a high pressure lubricant and a pumping land depressed below the level of said lands of uniform height forming a lubricant pressurizing pump in open communication with said pocket and operable upon the relative rotation between said non-rotatable intermediate bearing member and said rotatable shaft member to highly pressurize all of the lubricant in said pocket, said second bearing surface comprising lands of uniform height surrounding a second hydrodynamic pocket, and communication means between said hydrodynamic pockets whereby the pressure generated within said bearing by said pumping land is effective to transmit the thrust between said thrust collar and said stationary member and to provide for the substantially frictionless alignment of said non-rotatable bearing member with said thrust collar.

2. A hydrodynamic self-aligning thrust bearing comprising a stationary member providing a bearing seat, a rotatable thrust collar member, and a non-rotatable bearing member positioned between said stationary and said rotatable members; said non-rotatable member presenting a bearing surface to said thrust collar member comprising a plurality of lands defining a first set of hydrodynamic pockets for containing a lubricant under high pressure to transmit thrust between said rotatable and said non-rotatable members and presenting a second bearing surface to said bearing seat comprising a plurality of lands defining a second set of hydrodynamic pockets for containing a lubricant under high pressure effective to provide for the substantially frictionless alignment of said non-rotatable member with said thrust collar member, communication means between said sets of pockets, and self-generating pressure means within said thrust bearing in open communication with said hydrodynamic pockets and operable upon relative rotation between said non-rotatable and said rotatable members to highly pressurize the lubricant in said pockets.

3. A hydrodynamic self-aligning thrust bearing comprising a stationary member provided with an arcuate bearing surface, a rotatable thrust collar member and a non-rotatable bearing member positioned between said stationary and said rotatable members; said non-rotatable member presenting a bearing surface to said thrust collar member comprising lands defining a first hydrodynamic pocket for containing a lubricant under high pressure and presenting a mating arcuate bearing surface to said arcuate bearing surface on said stationary member, one of said arcuate surfaces having a recess formed therein to provide a second hydrodynamic pocket, communication means connecting said hydrodynamic pockets, and self-generating pressure means within said thrust bearing operable upon relative rotation between said non-rotatable and said rotatable members to highly pressurize all the lubricant in said pockets, said high pressure lubricant being effective to transmit thrust between said members and to provide precise stationary frictionless alignment of said non-rotatable member with said thrust collar member.

4. The combination as set forth in claim 3, in which said pockets are connected by a throttled passage.

5. A hydrodynamic self-aligning thrust bearing comprising a stationary member providing an arcuate bearing seat having a plurality of lands defining a first set of hydrodynamic pockets for containing a lubricant under high pressure, a rotatable thrust collar member, and a non-rotatable bearing member positioned between said stationary and said rotatable members; said non-rotatable member presenting a bearing surface to said thrust collar member comprising a plurality of lands defining a second set of hydrodynamic pockets for containing a lubricant under high pressure for transmitting thrust therebetween and presenting a mating arcuate surface to said bearing seat, communication means between said sets of pockets and self-generating pressure means within said thrust bearing in open communication with said pockets and operable upon relative rotation between said non-rotatable and said rotatable members to highly pressurize all the lubricant in said pockets.

6. A self-contained self-aligning hydrodynamic thrust bearing comprising a stationary member having an arcuate bearing seat, a rotatable shaft having a radially extending thrust collar member thereon, and a non-rotatable bearing member positioned between said stationary and said rotatable members; said non-rotatable member providing a first bearing surface for coacting with said thrust collar member to oppose the axial thrust on said shaft and a substantially opposed arcuate bearing surface for coacting with said arcuate bearing seat, said first bearing surface comprising a plurality of lands at the peripheral edge thereof projecting toward said thrust collar member and defining a first set of hydrodynamic pockets for containing a lubricant under high pressure, pumping lands within said first set of pockets depressed below the level of the pocket defining lands and operable upon the relative rotation of said rotatable and non-rotatable members to highly pressurize all the lubricant in said pockets, said arcuate bearing surface comprising a plurality of lands projecting toward said bearing seat and defining a like plurality of hydrodynamic pockets for containing lubricant under high pressure, a plurality of ducts respectively connecting each of the pockets of said first set with one of the pockets of said second set whereby the high pressure lubricant output of said pumping lands is effective to provide for the substantially frictionless movement between said stationary member and said non-rotatable member.

7. A hydrodynamic self-aligning thrust bearing comprising a stationary member providing a bearing seat, a rotatable thrust collar member, and a non-rotatable bearing member positioned between said stationary and said rotatable member; said non-rotatable member presenting a first bearing surface to said thrust collar member for cooperating with said thrust collar member for containing a lubricant under high pressure and presenting a second bearing surface to said bearing seat for cooperating with said bearing seat to contain a lubricant under high pressure, said first bearing surface comprising a pair of parallel lands of uniform height forming the sides of a first hydrodynamic pocket, a pair of lands of like height connecting the respective ends of said first pair of lands, and a pumping land within said pocket extending between and connecting said parallel pair of lands and depressed below the level of said parallel lands, said pumping land being operable upon relative rotation of said rotatable and non-rotatable members to provide high pressure lubricant for said pocket, said second bearing surface comprising a plurality of lands defining a second hydrodynamic pocket for containing a lubricant under high pressure, and communication means between said hydrodynamic pockets whereby the pressure generated within said bearing by said pumping land is effective to transmit the thrust from said thrust collar to said stationary member and to provide for the substantially frictionless alignment of said non-rotatable bearing member with said thrust collar member.

8. The combination as set forth in claim 7, in which the pair of lands forming sides of said pocket adjacent said pumping land are tapered in the direction of rotation.

9. A hydrodynamic self-aligning thrust bearing comprising a stationary member providing a bearing seat, a rotatable thrust collar member, and a non-rotatable bearing member positioned between said stationary and said rotatable members; said non-rotatable member presenting a bearing surface to said thrust collar comprising a plurality of lands defining a first set of hydrodynamic pockets for containing a lubricant under high pressure to transmit thrust between said rotatable and said non-rotatable members and presenting a second bearing surface to said bearing seat comprising a plurality of lands defining a second set of hydrodynamic pockets for containing a lubricant under high pressure effective to provide for the substantially frictionless alignment of said non-rotatable member with said thrust collar member, communication means between said sets of pockets, and self-generating pressure means within said thrust bearing in open communication with said hydrodynamic pockets and operable upon relative rotation between said non-rotatable and said rotatable members to highly pressurize the lubricant in said pockets, said second set of hydrodynamic pockets plus one-half the area of the surrounding lands having an area projected on a plane perpendicular to the axis of said rotation of said thrust collar of less than the area of said first set of hydrodynamic pockets.

10. A hydrodynamic self-aligning thrust bearing comprising a stationary member provided with an arcuate bearing surface, a rotatable thrust collar member and a non-rotatable bearing member positioned between said stationary and said rotatable members; said non-rotatable member presenting a bearing surface to said thrust collar member comprising lands defining a first hydrodynamic pocket for containing a lubricant under high pressure and presenting a mating arcuate bearing surface to said arcuate bearing surface on said stationary member, one of said arcuate surfaces having a recess formed therein to provide a second hydrodynamic pocket, communication means connecting said hydrodynamic pockets, and self-generating pressure means within said thrust bearing operable upon relative rotation between said non-rotatable and said rotatable members to highly pressurize all the lubricant in said pockets, said high pressure lubricant being effective to transmit thrust between said bearing members and to provide precise stationary frictionless alignment of said non-rotatable member with said thrust collar member, the ratio of the effective area of the second hydrodynamic pocket times the width of the lands surrounding the second hydrodynamic pocket divided by the effective perimeter of the lands surrounding the second hydrodynamic pocket being in the range of three times the equivalent ratio for first said hydrodynamic pocket.

References Cited in the file of this patent

UNITED STATES PATENTS 2,155,455    Thoma _____ Apr. 25, 1939